United States Patent
Hartig

[11] Patent Number: 5,666,991
[45] Date of Patent: Sep. 16, 1997

[54] SHUT-OFF VALVE FOR EVACUATION AND FILL WITHOUT ENERGIZING VALVE

[75] Inventor: Julie A. Hartig, Bunde, Netherlands

[73] Assignee: ITT Automotive Inc., Auburn Hills, Mich.

[21] Appl. No.: 567,642

[22] Filed: Dec. 5, 1995

[51] Int. Cl.$^6$ .................................................. F16K 43/00
[52] U.S. Cl. ........................................ 137/316; 137/67
[58] Field of Search ...................................... 137/316, 67

[56] References Cited

U.S. PATENT DOCUMENTS 3,586,018  6/1971  Bogardh .................................. 137/67

*Primary Examiner*—Denise L. Ferensic
*Assistant Examiner*—Joanne Y. Kim
*Attorney, Agent, or Firm*—J. Gordon Lewis; Thomas N. Twomey

[57] ABSTRACT

A shut-off valve used in a fluid transmission line for the evacuation and fill of a fluid without the need for first energizing the valve to keep the valve in an open position by using a collar on the shaft of said valve which dissolves or disintegrates automatically upon contact with the fluid for a predetermined length of time such that the valve returns to its normal control functions.

4 Claims, 2 Drawing Sheets

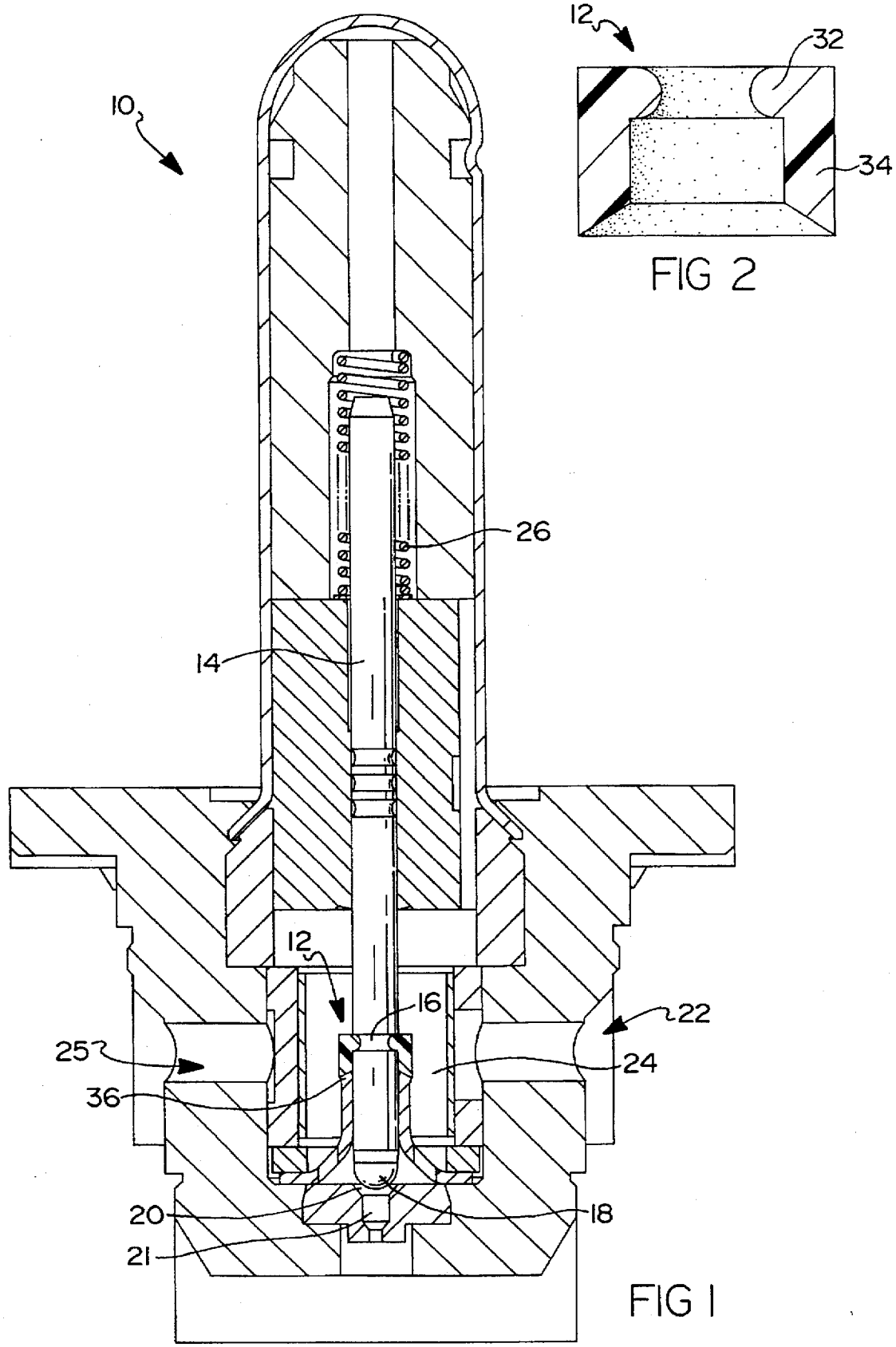

SHUT-OFF VALVE FOR EVACUATION AND FILL WITHOUT ENERGIZING VALVE

FIELD OF THE INVENTION

The present invention generally relates to a shut-off valve used in a fluid powered control line and more particularly, relates to a shut-off valve situated in a brake line for the evacuation and fill of brake fluid in the line without having to first energize and open the valve.

BACKGROUND OF THE INVENTION

In the operation of a motor vehicle, various fluids are used in hermetically sealed environments for achieving control functions of the vehicle. One such example of a typical fluid powered control application is the control of brakes on a vehicle. When the brakes on a vehicle are energized, the brake fluid contained in the hermetically sealed brake line transmits the pressure applied on the brake pedal by the driver to the brake pads mounted on each wheel.

In a fluid control line, numerous valve mechanisms are required to regulate the flow of the fluid. One such mechanism is a shut-off valve, generally employed in an anti-lock braking system (ABS) or traction control system, and which is used to completely close the line and stop the passage of fluid to an open area. It is not uncommon to provide one such shut-off valve for each brake line—thus four (4) shut-off valves would be used in such a vehicle brake system.

During the assembly of a vehicle, the shut-off valves become part of the brake system. The brake lines, however, must be filled with brake fluid before the vehicle can be shipped out of the factory. This conditioning process has two aspects: first, a mechanical aspect wherein the lines are first evacuated of air by applying a vacuum source thereto, and then filled with brake fluid to pressurize the brake system. The second aspect is electrical in nature. Particularly, since the vehicle is generally without a battery at this point in the assembly, and further, the shut-off valves are normally closed, energizing power and communication messages must be provided to the vehicle to be able to command the shut-off valves open to perform the above-mentioned evacuation/fill step.

Conventionally, a test cart must be rolled up to the vehicle to provide the energizing power and command messages in order to place the valves in the open position. The system is then subjected to the above-mentioned evacuation/fill procedure. The particular aspect of providing energizing power and command messages to the vehicle is a complicated procedure that is undesirable in an automobile assembly line for several reasons, including the disruption to the assembly process (which may require personnel to leave their position to connect power and/or send command messages—thus possibly contaminating other areas of the vehicle with brake fluid).

Thus, there is a need to provide an improved shut-off valve and/or conditioning technique that eliminates or minimizes one or more problems as stated above.

SUMMARY OF THE INVENTION

In accordance with the present invention, a shut-off valve for a fluid control line installed in a motor vehicle is provided that can be evacuated and filled without energizing the valve. In particular, the improvement of the present invention provides a temporary "open" position for the normally closed shut-off valve, which permits evacuation/ filling to occur without the problems associated with providing valve energizing power and command messages to the vehicle, but which automatically permits the shut-off valve to assume its normally closed position after evacuation/filling has occured.

In a preferred embodiment, a collar frictionally engages a shaft of the shut-off valve such that the valve is held back in the above-mentioned temporary open position when the vehicle is being assembled and the line is being evacuated/ filled. The collar is preferably contemplated as being over-molded to the shaft. The collar is made of a material that dissolves or disintegrates upon contact with the fluid for a predetermined length of time such that the shaft of the shut-off valve is released to return the valve to its normally closed position so that it can open or close to perform its normal functions.

In an alternate embodiment, a combination of a retaining clip/collar is used on the shaft of the shut-off valve in order to keep the valve in the temporary open position when the vehicle is being assembled and prior to the line being filled with the fluid. This collar is also made of a material such that it will completely dissolve or disintegrate upon contact with the fluid (e.g., conventional hydraulic brake fluid—DOT3 standard) for a predetermined length of time such that the shaft is released and the valve closes to resume its normal function.

BRIEF DESCRIPTION OF THE DRAWINGS

Other objects, features, and advantages of the present invention will become apparent upon consideration of the specification and the appended drawings, in which:

FIG. 1 is a schematic showing an enlarged cross-sectional view of a present invention shut-off valve in the preferred embodiment.

FIG. 2 is a schematic showing an enlarged cross-sectional view of a press-fit collar.

DETAILED DESCRIPTION OF THE PREFERRED AND THE ALTERNATE EMBODIMENT

Figure 3:
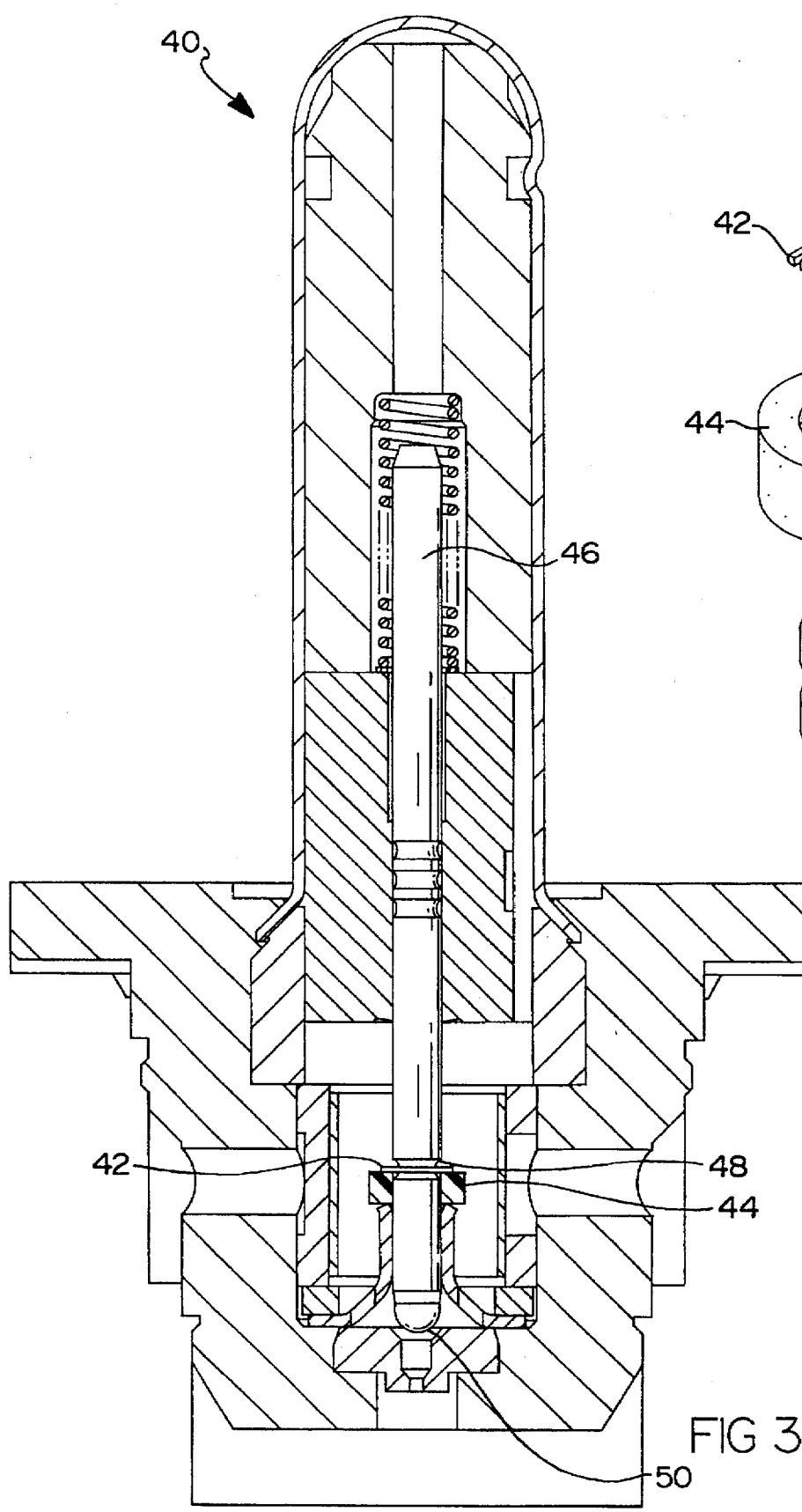
FIG. 3 is a schematic showing an enlarged cross-sectional view of the present invention shut-off valve in an alternate embodiment.

The present invention provides a shut-off valve for a fluid control line in a motor vehicle that remains in an open position during the vehicle assembly process prior to the filling of fluid in the control line.

The improved shut-off valve utilizes a collar either over-molded to or held in place by a retaining clip on the shaft of a shut-off valve to keep the normally closed valve in an open position. The collar is made of a material which completely dissolves or disintegrates upon contact with the fluid within a predetermined length of time such that the shaft is automatically released and the valve is allowed to function in its normal fashion. The material must also be such that upon complete dissolution and disintegration, it does not cause a chemical contamination problem to the fluid such that its working characteristics are changed or produces particulate matters that may cause blockage in the fluid control line or valves.

Referring initially to FIG. 1, where it is shown an enlarged cross-sectional view of a shut-off valve 10 equipped with a collar 12 in accordance with the preferred embodiment of the present invention. The shaft 14 of the valve 10 is equipped with an annular groove 16 to retain the collar 12 through frictional engagement. Collar 12 may be overmolded to shaft 14 (i.e., formed in place onto shaft 14 about groove 16), or, alternatively, may be formed separately and press fit to frictionally engage shaft 14. The valving arrangement, comprised of tip 18 and seat 20, remains in an open position during vehicle assembly and prior to the filling of fluid in the line. The valve passage 21 is open when the shaft 14 is stuck in such open position.

Valve 10 is of the type that is normally closed; thus, operation of the brakes causes fluid to enter inlet 22, and further through a passageway 24 to outlet 25. As the fluid pressure increases, the brakes in communication with outlet 25 are operated.

During an ABS stop, the valve formed by tip 18 and valve seat 20 opens to relieve fluid pressure on the locked wheels to thereby unlock the wheels to accomplish its anti-lock function. Fluid is exhausted through valve passage 21 at the bottom of valve 10 to a lower pressure side.

Spring 26 biases valve head or tip 18 towards valve opening or seat 20 for closing the valve 10.

An enlarged cross-sectional view of collar 12 is shown in FIG. 2. It is seen that collar 12 is constructed with a circular body portion 32 and a leg portion 34. Leg portion 34 butts against flange 36 in shut-off valve 10. When collar 12 is formed separately from valve 10, it snap-fits or press-fits over groove 16 prepositioned on shaft 14. Whether overmolded or press-fit, sufficient pressure is exerted on shaft 14 by collar 12 to hold it in an open position against spring 26, which acts on shaft 14 and would otherwise have kept it in a closed position.

The collar material should be carefully chosen so that it dissolves or disintegrates in the hydraulic fluid once the valve is filled and collar 12 is exposed to the fluid for a predetermined length of time. A suitable length of time may preferably be between about 1 minute to about 5 minutes; however, this time may be as long as 1 hour or more. The particular time for any one embodiment depends upon the time interval between when evacuation/fill is performed and when the test of the brake system must be done. This varies significantly between particular customers and assembly plants. For example, it has been found that in one vehicle assembly process, it took approximately 1 minute to perform an evacuation and fill of the fluid and approximately 6 minutes until a pedal push test was to be performed on the vehicle.

In one valve embodiment of the assignee of the present invention, a total height tolerance of collar 12 was determined to be 0.1 mm. If collar 12 is to be made separately, it can be formed either by molding or by casting or other forming method so that it can be easily assembled to the shaft.

A suitable material for the collar is polycarbonate. Other suitable materials include lacquer and ABS (Acrylonitrile Butadiene Styrene), which perform equally well in the present invention.

FIG. 3 shows an enlarged cross-sectional view of a shut-off valve 40 equipped with a collar in accordance with an alternate embodiment of the present invention. A retaining clip, such as cotter pin 42, is used in conjunction with a collar 44. Other types of retaining clips, such as a C-clip among others, may also be used. It is seen that no groove on the outer peripheral surface of shaft 46 is required for installation of the collar 44. Instead, cotter pin 42 is installed on a preset groove 48 on shaft 46. The thickness of collar 44 should be at least larger than that of the clearance 50 of the opening of the valve such that it can effectively block the valve when in an open position during evacuation and fill.

Figure 4:
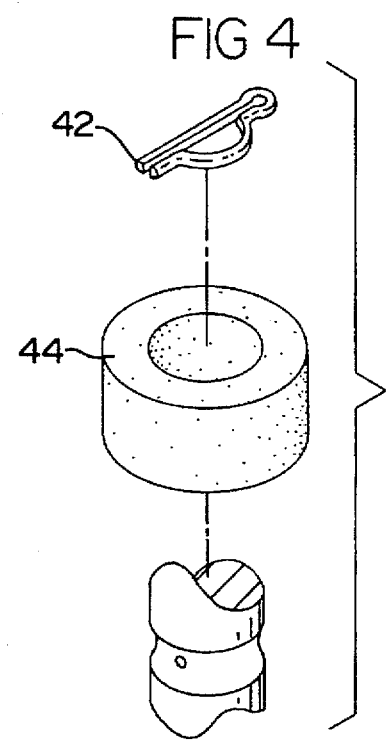
FIG. 4 is a schematic showing an enlarged cross-sectional view of a cotter pin/collar arrangement.

A detailed enlarged cross-sectional view of cotter pin 42 and collar 44 is shown in FIG. 4.

While the present invention has been described in an illustrative manner, it should be understood that the terminology used is intended to be in a nature of words of description rather than of limitation.

Furthermore, while the present invention has been described in terms of a preferred and an alternate embodiment thereof, it is to be appreciated that those skilled in the art will readily apply these teachings to other possible variations of the invention. For instance, other constructions similar to the collar and cotter pin shown in the preferred and the alternate embodiment should work equally well and substantially achieving the same desirable results of the present invention.

The embodiments of the invention in which an exclusive property or privilege is claimed are defined as follows:

1. A shut-off valve for use in a pressure control system filled with a fluid, said valve being equipped with a shaft having a valve head biased towards a valve opening for closing said valve, comprising:

a collar member frictionally engaging the shaft such that the valve head is kept away from the valve opening until such time when said collar member is in contact with said fluid for a length of time sufficient to dissolve said collar member to release the shaft to allow the valve head to be received in the valve opening to thereby close said valve, wherein said shaft further includes a groove formed in an outer peripheral surface of the shaft for frictionally engaging said collar member.

2. A shut-off valve for use in a pressure control system filled with a fluid, said valve being equipped with a shaft having a valve head biased towards a valve opening for closing said valve, comprising:

a collar member frictionally engaging the shaft such that the valve head is kept away from the valve opening until such time when said collar member is in contact with said fluid for a length of time sufficient to dissolve said collar member to release the shaft to allow the valve head to be received in the valve opening to thereby close said valve, wherein said collar is made of a material selected from the group consisting of polycarbonate, lacquer and ABS.

3. A shut-off valve according to claim 2, wherein said collar member is molded of a polycarbonate material having a thickness between about 1 to about 1.5 mm.

4. A shut-off valve for use in a pressure control system filled with a fluid, said valve being equipped with a shaft having a valve head biased towards a valve opening for closing said valve, comprising:

a collar member frictionally engaging the shaft such that the valve head is kept away from the valve opening until such time when said collar member is in contact with said fluid for a length of time sufficient to dissolve said collar member to release the shaft to allow the valve head to be received in the valve opening to thereby close said valve, wherein said collar member comprises a collar and a retaining pin, said retaining pin frictionally engaging said shaft to keep said collar in place such that said valve head is kept away from said valve opening.

\* \* \* \* \*